United States Patent [19]
Lyons

[11] 3,855,323
[45] Dec. 17, 1974

[54] OLEFIN ISOMERIZATION CATALYSTS AND PROCESS

[75] Inventor: James E. Lyons, Wallingford, Pa.

[73] Assignee: Sun Ventures, Inc., St. Davids, Pa.

[22] Filed: May 10, 1972

[21] Appl. No.: 251,986

Related U.S. Application Data

[63] Continuation-in-part of Ser. No. 80,750, Oct. 14, 1970, abandoned.

[52] U.S. Cl.... 260/666 A, 260/429 R, 260/666 PY, 260/683.2
[51] Int. Cl....... C07c 5/00, C07c 5/22, C07c 15/00
[58] Field of Search ....... 260/666 A, 666 PY, 683.2

[56] References Cited
UNITED STATES PATENTS

| | | | |
|---|---|---|---|
| 3,721,718 | 3/1973 | Hughes et al. | 260/683.2 |
| 3,530,198 | 9/1970 | Feuton | 260/666 A |

Primary Examiner—Paul M. Coughlan, Jr.
Assistant Examiner—Veronica O'Keefe
Attorney, Agent, or Firm—George L. Church; Donald R. Johnson; Stanford M. Back

[57] ABSTRACT

The activity of olefin isomerization catalysts such as $RuCl_2(Ph_3P)_3$ may be substantially enhanced in the presence of compounds which are readily decarbonylated by $RuCl_2(Ph_3P)_3$ to form carbonyl derivatives of said catalysts.

11 Claims, No Drawings

OLEFIN ISOMERIZATION CATALYSTS AND PROCESS

CROSS REFERENCE TO RELATED APPLICATION

This application is a continuation-in-part of U.S. Ser. No. 80,750 filed Oct. 14, 1970, in the name of James E. Lyons entitled 'IMPROVED OLEFIN ISOMERIZATION CATALYST AND PROCESS' (now abandoned).

BACKGROUND OF THE INVENTION

This invention relates to novel olefin isomerization catalysts, and to methods for preparing and using the same. More particularly, this invention relates to an improved method for isomerizing olefins and diolefins in the presence of novel metal carbonyl catalysts formed by reacting certain ruthenium complexes with compounds which are readily decarbonylated in the presence of said complexes. This invention is also directed to the novel metal carbonyl catalysts themselves.

It is known that such compounds as $RuCl_2(Ph_3P)_3$ are catalysts for the isomerization of olefins. See, for example, Abley et al, Disc. of Farady Soc., 46, 31, 37 (1968). These reactions, however, are often characterized by very slow reaction rates, thus making such processes commercially impracticable.

There is also taught, in U.S. Pat. No. 3,530,198, a process for the preparation of olefins from carboxylic acids or their esters comprising contacting said acid or ester with a catalyst comprising a Group VIII metal complexed with an organometallic ligand of phosphorus, arsenic or antimony, to form olefins, carbon monoxide and water or alcohol. However, notwithstanding the presence of CO, olefin and organometallic catalyst in the reaction medium of this process, no increase in isomerization rate or selectivity is obtained when employing the acid or ester starting materials of this patented process in conjunction with the olefins of the present invention, as demonstrated by certain comparative examples set forth below. Moreover, as these examples will also demonstrate, none of the carbonyl complex comprising the novel catalyst of this invention is formed when this prior art method is employed.

SUMMARY OF THE INVENTION

It has now been found, in accordance with the present invention, that the rate and selectivity of olefin isomerization metal complex catalysts of the formula

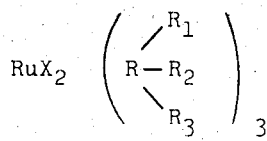

wherein X is halogen; and $R_1$, $R_2$ and $R_3$ are a lower alkyl group having from 1 to 6 carbon atoms, a cycloalkyl group, or an aryl (i.e., phenyl, tolyl, naphthyl, etc.) group, and wherein $R_1$, $R_2$ and $R_3$ may be the same or different, may be substantially enhanced by reacting said complexes with organic compounds which are readily decarbonylated by said complexes (i.e., CO-donating compounds) to form novel carbonyl derivatives thereof. These carbonyl derivatives formed from said metal complexes and said compounds which are decarbonylated are metal carbonyl complexes having the formula

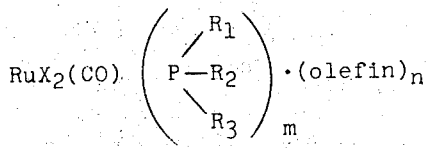

wherein X and $R_1$, $R_2$ and $R_3$ are as defined above, and $m$ and $n$ are 2 or 3, and 0 or 1 respectively, depending upon the olefin or the compound which is decarbonylated. It is these carbonyl compounds which comprise the improved olefin isomerization catalysts of this invention.

These improved catalysts are advantageous in that they permit the isomerization reaction to be carried out at a rapid rate in a highly selective manner under mild conditions in the absence of air or oxygen which tends to deactivate the ruthenium metal complexes over a period of time. The yields obtained are, in most instances, substantially quantitative.

These novel catalysts and process are particularly advantageous in that they provide a homogeneous reaction medium under mild conditions to give rapid but selective double-bond isomerization reactions wherein the double bond shifts take place in a stepwise manner. In addition, skeletal rearrangements, polymerization and other undesirable side reactions do not occur to any detectable extent.

Thus, for example, despite the dramatic rise in the reaction rates there is no loss in selectivity in these isomerizations. For example, cycloalkadienes which are prone to disproportionation when conventional catalysts are used (acid, base, heterogeneous metal and some soluble catalysts), are smoothly and rapidly isomerized, as shown in Equations 1 and 2. Similarly, vinyl-substituted cyclic hydrocarbons, as shown in Equations 3, 4 and 5, which are prone to give many isomers as well as disproportionation products, are isomerized to a single exocyclic olefin:

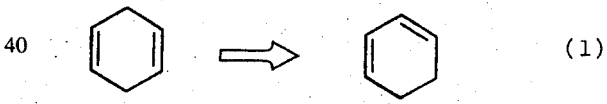 (1)

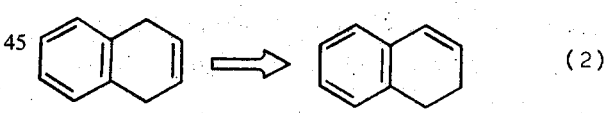 (2)

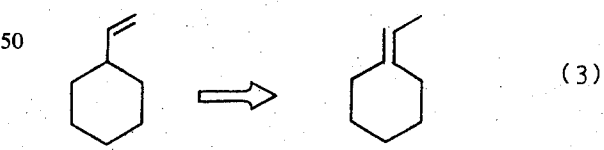 (3)

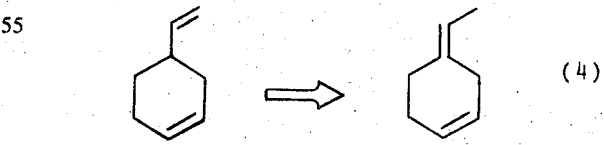 (4)

 (5)

DESCRIPTION OF THE INVENTION

The novel catalysts of this invention may be conveniently formed and the isomerization process carried out by first dissolving the aforedescribed ruthenium metal complex in the olefin which is to be isomerized, followed by addition of the CO-donating compound to form the metal carbonyl catalysts in situ. The reaction mixture is then heated at a temperature of from about 70° to 140°C, and preferably from 90° to 100°C for from 12 to 28 hours, and most preferably from 16 to 20 hours, under and inert atmosphere such as nitrogen or helium. The reaction product may readily be recovered from the reaction mixture by vacuum distillation or like methods, leaving the catalyst material which may then be used again in its existing form without further treatment.

It will be understood, of course, that while it is more convenient to form the metal carbonyl catalyst of this invention in situ in the olefin starting material as described above, it is also contemplated that said catalyst may be formed separately in a suitable olefin and then added to the reaction medium.

The olefin starting materials employed in carrying out this process include monoolefins such as 1-hexene, 1-octene, allylbenzene or vinylcycloalkanes, and diolefins such as vinylcycloalkenes, cycloalkadienes, straight-chain dienes, and like olefins which have been previously isomerized using known prior art methods.

The aforementioned metal complexes include compounds having the formula

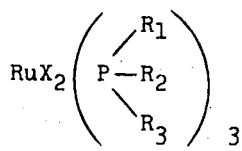

wherein X and $R_1$, $R_2$ and $R_3$ are as defined above. Of these, the ruthenium compounds of the formula $RuCl_2(Ph_3P)_3$ are preferred, wherein Ph is phenyl. The molar concentration of metal complex to be used in accordance with the invention is not critical, but is desirably in the range of from $10^{-2}$ to $10^{-4}$ moles of catalyst per liter of olefin, and preferably about $10^{-3}$ moles. Larger amounts amounts may be employed but are not necessary.

The organic CO-donating compounds are, as mentioned above, those compounds which decarbonylate readily in the presence of the above metal complexes to form carbonyl derivatives of said metal complexes. Included amongst those materials are carbon monoxide, ethylene oxide, styrene oxide, butadiene monoxide, phenylacetaldehyde, benzaldehyde, crotonaldehyde, epoxides, formic acid esters such as benzyl formate, alcohols and related materials. However, other carboxylic acids than formic acid, such as acetic acid and higher homologues thereof, and their esters, are not effective CO-donating compounds for purposes of this invention. When carbon monoxide is employed as the carbonyl compound, it is desirable to bubble a stream of this gas through the olefin prior to addition of the metal complex. The amount and manner in which carbon monoxide is added should be carefully regulated to avoid formation of a catalytically inactive dicarbonyl complex. Generally, however, the molar concentration of the carbonyl-donating compounds may vary from $10^{-1}$ to $10^{-3}$ moles of compound per liter of olefin, and preferably about $10^{-2}$ moles.

In a further embodiment of this invention, it has been found that ruthenium complexes having arsine ligands may be substituted for the ruthenium phosphine complexes described above as starting materials in the preparation of the improved catalysts of this invention. Thus, it has been found that complexes of the formula

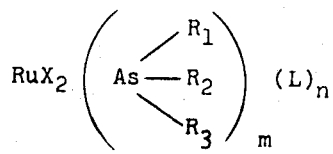

wherein X and $R_1$, $R_2$ and $R_3$ are as defined above, L is a low molecular weight alcohol or ketone such as methanol, ethanol, acetone or the like, m is 2 to 4, and n is 0 or 1, when contacted in the same manner and with the same organic compounds described above which are readily decarbonylated to form effective olefin isomerization catalysts of the formula

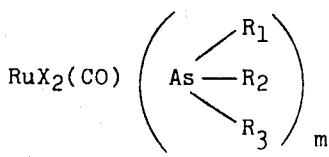

wherein X, $R_1$, $R_2$ and $R_3$, and m are as defined above.

These above-described ruthenium arsine complexes used in the preparation of the improved catalysts of this invention are prepared by contacting a ruthenium halide with the respective substituted arsine compound in a lower molecular weight alcohol or ketone solvent. Thus, depending upon the precise nature of the $R_1$, $R_2$ and $R_3$ compounds as well as the solvent employed, the number of arsine groups and L groups will vary accordingly.

The following examples are provided to illustrate the novel processes and products of this invention.

EXAMPLE 1

Carbon monoxide was bubbled rapidly through pure 4-vinylcyclohexene (free of oxygen or hydroperoxides) for 30 seconds. The 4-vinylcyclohexene had been purified by distillation under nitrogen followed by percolation through activated selica gel under nitrogen. The olefin, 10 ml., was added to 0.062 gm. of $[RuCl_2(Ph_3P)_3]$ and the mixture stirred under nitrogen for 18.5 hours. After this time the reaction mixture was allowed to cool to room temperature and g.l.p.c. analysis showed 23.2 percent isomerization had occured (see Table 1 for isomer distribution). A similar experiment carried out in the absence of CO gave less than 1.5 percent isomerization after 20 hours. Introduction of CO, therefore, gave a 15-fold increase in the percent of isomerization.

An orange complex, I (m.p.=190°C dec.), was precipitated in 40 percent yield (0.025 gm) after reaction by adding 50 ml. of n-pentane to the reaction mixture. The infrared spectrum [$\nu CO=5.1\mu(vs)$; $\nu Ph_3P=9.1\mu(s)$] showed that this material was a carbonyl complex. It was capable of isomerizing pure 4-vinylcyclohexene at a rapid rate even in the absence of added CO. The results of this run are summarized in Table I.

TABLE I

The Effect of CO, Aldehydes and Epoxides on Olefin Isomerization by $RuCl_2(Ph_3P)_3$

| Example No. | Olefin | Co-Catalyst | Time (Hrs.) | Temp (°C) | Ru(II) (M/L)(d) | Co-Cat. (M/L)(d) | Products, (%) | Isomerization (%) | Ruthenium Complex After Reaction Color | IR | m.p.(°C) | Yield(%) |
|---|---|---|---|---|---|---|---|---|---|---|---|---|
| 1 | 4-VCH(e) | CO | 18.5 | 100 | 6.6x10⁻³ | (a) | trans-4-ECH, 7.8; cis-4-ECH, 7.7; trans-3-ECH, 1.0; cis-4-ECH, 1.0; Other, 5.7 | 23.2 | Orange | 5.1μ(vs) 9.1μ(s) | ~190 dec. | 40 |
| 2 | " | Ethylene oxide | 19.5 | 100 | 6.6x10⁻³ | (a) | trans-4-ECH, 0.2; cis-4-ECH, 0.3; trans-3-ECH, 41.1; cis-4-ECH, 52.8; ethylcyclohexadiene, 4.5; Other, 0.9 | 99.8 | Brown | 5.1μ(m) 9.1μ(vvs) | (c) | 10 |
| 3 | " | Styrene oxide | 29.0 | 100 | 6.6x10⁻³ | 5x10⁻² | cis+trans-ECH, 1.4; trans-3-ECH, 41.5; cis-4-ECH, 51.1; Other, 4.8 | 99.0 | Tan | 5.1μ(vs) | (c) | (c) |
| 4 | 4-VCH | Benzylformate | 19.0 | 100 | 6.6x10⁻³ | 8x10⁻² | cis+trans-4-ECH, 0.3; trans-3-ECH, 43.3; cis-3-ECH, 53.9; Other, 2.5 | 99.8 | Tan | 5.0μ(s) 9.1μ(s) | 137-147 dec. | 58 |
| 5 | 4-VCH(e) | None | 18 | 100 | 6.6x10⁻³ | - | trans-4-ECH(f), 0.7; cis-4-ECH, 0.7; Other, 0.1 | 1.5 | Gold | 6.4μ(m) 9.1μ(s) (doublet) | 110-113 → clear melt | 46 |
| 6 | " | Penylacetaldehyde(b) | 19.5 | 100 | 6.6x10⁻³ | 5x10⁻² | trans-4-ECH, 12.2; cis-4-ECH, 14.6; trans-3-ECH, 13.5; cis-3-ECH, 15.6; Other, 7.9 | 63.5 | Tan | 5.1μ(s) (doublet) 9.1 | (c) | 59 |
| 7 | " | Crotonaldehyde | 29.0 | 100 | 6.6x10⁻³ | 1x10⁻¹ | trans-4-ECH, 3.5; cis-4-ECH, 3.3; cis+trans-3-ECH, 0.9; Other, 1.5 | 9.2 | Tan | 5.1μ(vs) 9.1μ(s) 6.1, 6.2(w) | (c) | (c) |
| 8 | Allylbenzene | None | 17.0 | 100 | 1x10⁻² | - | cis-propenylbenzene, 1.6; trans-propenylbenzene, 3.7; Other, 0.2 (indane) | 5.5 | Green Brown | 9.1(s) | ~225 dec. | (c) |
| 9 | " | Ethylene oxide | 19.0 | 100 | 1x10⁻² | (a) | cis-propenylbenzene, 5.5; trans-propenylbenzene, 93.9; Other, 0.1 | 99.5 | Tan | 5.1μ(vs) 9.1μ(vs) | (c) | 10 |
| 10 | " | Styrene oxide | 17.5 | 100 | 6.6x10⁻³ | 5x10⁻² | cis-propenylbenzene, 5.0; trans-propenylbenzene, 94.6; Other, 0.2 | 99.8 | Green | 5.1μ(m) 9.1μ(vs) | >300 | 15 |
| 11 | " | CO | 17.0 | 100 | 1x10⁻² | (a) | cis-propenylbenzene, 24.1; trans-propenylbenzene, 28.5; Other, 1.3 (indane) | 53.9 | Red-Brown | 5.1μ(vs) 9.1μ(s) | 270-277 | 40 |
| 12 | 4-VCH | Benzaldehyde | 17.0 | 100 | 6.6x10⁻³ | 9x10⁻² | trans-4-ECH, 3.7; cis-4-ECH, 4.2; trans-3-ECH, 0.4; cis-3-ECH, 0.5; Other, 2.5 | 11.3 | Dark tan | 5.1μ(vs) 9.1μ(s) | | 33 |

TABLE I(Continued)

| Example No. | Olefin | Co-Catalyst | Time (Hrs.) | Temp (°C) | Ru(II) (M/L)[d] | Co-Cat. (M/L)[d] | Products, (%) | Isomerization (%) | Ruthenium Complex After Reaction Color | IR | m.p.(°C) | Yield(%) |
|---|---|---|---|---|---|---|---|---|---|---|---|---| a. Administered by bubbling the gas rapidly through the olefin for several minutes prior to addition of catalyst b. 50 percent solution in ethanol c. This data was not obtained d. M/L = moles/liter e. VCH = vinylcyclohexene f. ECH = ethylidenecyclohexene

EXAMPLE 2

According to the procedures of Example 1, ethylene oxide was bubbled through 10 ml. of pure 4-vinylcyclohexene for 30 seconds prior to addition of 0.062 gm. [RuCl$_2$(Ph$_3$P)$_3$]. After stirring at 100°C under nitrogen for 19.5 hours g.l.p.c. analysis showed that 99.8 percent isomerization had occured as compared with <1.5 percent without ethylene oxide. Addition of 50 ml. n-pentane to the reaction mixture precipitated 0.0062 gm. (10 percent yield) of a brown solid having absorptions in the infrared at 5.1 and 9.1 characteristic of Ru-CO and -PPh$_3$ respectively. The results of this run are summarized in Table 1.

EXAMPLE 3

A $5 \times 10^{-2}$M solution of styrene oxide (10 ml.) in pure (cf. Example 1) 4-vinylcyclohexene was added to 0.062 grams of [RuCl$_2$(Ph$_3$P)$_3$] and the solution stirred at 100°C under nitrogen for 29 hours. Glpc analysis showed that the extent of isomerization was 99 percent. Addition of pentane to the reaction mixture gave a tan solid having infrared absorptions at 5.1 $\mu$ (Ru-Co) and 9.1 $\mu$ (Ph$_3$P). The results of this run are summarized in Table I.

EXAMPLE 4

According to the procedure of Example 3, 0.1 ml. of benzylformate, 10.0 ml. of 4-vinylcyclohexene, and 0.062 gm. [RuCl$_2$Ph$_3$]$_3$ were stirred at 100°C under nitrogen for 19 hours. Isomerization was complete and products are listed in Table 1. Addition of 50 ml. pentane to the reaction mixture gave 0.036 gm. (58 percent yield) of a tan carbonyl complex [$\nu$(CO)=5.0$\mu$(s); $\nu$(Ph$_3$P)=9.1$\mu$(s)] which decomposed from 137° to 147°C. The results of this run are summarized in Table 1.

EXAMPLES 5 to 12

In accordance with the general procedures of the foregoing examples, but varying the olefin substrate, the CO-donating catalyst, together with the quantities of catalyst and the reaction times, there were obtained the results tabulated below in Table 1 as Examples 5 to 12, along with the tabulation of the results of Examples 1 to 4.

EXAMPLE 13

In accordance with the general procedures of Example 4, 0.062 gms. of RuCl$_2$(PEt$_2$Ph)$_3$, where Et is ethyl and PH is phenyl, is stirred together with 10 ml. of 1-hexene under nitrogen atmosphere at 64PC in the presence of 0.5 ml. of ethanol for 48 hours. At the end of that period analysis of the reaction product by glpc shows that a mixture of isomeric hexenes is obtained in good yield.

EXAMPLE 14

In accordance with the foregoing procedure, but substituting RuCl$_2$(Ph$_3$As)$_2$(CH$_3$OH) for RuCl$_2$(PEt$_2$Ph)$_3$, there is obtained the same mixture of isomeric hexenes in good yield.

EXAMPLE 15

In accordance with the procedures of Example 2, vinylcyclohexene (99 percent), vinylcyclopentane was isomerized to ethylidenecyclopentane (98 percent) and 1,4-dihydronaphthalene was isomerized to 1,2-dihydronaphthalene (99 percent).

EXAMPLE 16

In comparison with the selective formation of 1,2-dihydronaphthalene (99 percent) from 1,4-dihydronaphthalene as demonstrated in Example 15, above, when the conditions and starting materials of Example 1 of U.S. Pat. No. 3,530,198 are applied to this compound, the following results are obtained:

To 0.5 g palladium chloride, 3 g. triphenylphosphine and 100 g. octanoic acid is added 10 mls. of 1,4-dihydronaphthalene and the mixture refluxed according to the procedures of Example 1 of U.S. Pat. No. 3,530,198. In addition to the octenes obtained from decarboxylation, there is observed the formation of 1,2-dihydronaphthalene — 38 percent, decalin —22 percent, naphthalene — 28 percent and others — 12 percent. It is noted that substantial amounts of palladium metal is deposited in the reaction flask.

The following three examples also illustrate the difference in the results obtained, particularly in the rates of isomerization, when the process of the present invention is compared with that of U.S. Pat. No. 3,530,198. Thus, the results of Examples 18 and 19, employing one of the carboxylic acids and ester thereof of that patent in the process of the present invention, when compared with the results obtained in Example 17, show that the prior art method yields only 5 to 6 percent in a given period while the instant method yields more than 99 percent for the same period.

Moreover, no carbonyl complex was recovered from the reaction medium of Examples 17 and 18.

EXAMPLE 17

The catalyst, RuCl$_2$(Ph$_3$P)$_3$, (0.05 h), was dissolved in 10 ml of 4-vinylcyclohexene to which 50 ml of a COdonor (enumerated below) was added. After warming the mixture at 90°C for 24 hours the extent of isomerization to 3- and 4-ethylidenecyclohexene was determined by glpc analysis. The results are tabluated below.

| Catalyst (50 mg) | Additive (50 l) | Temp. (°C.) | % Reaction 4-VCH (10 ml) 24 hours |
|---|---|---|---|
| RuCl$_2$(Ph$_3$P)$_3$ | None | 90 | 5 |
| do. | Benzylformate | 90 | 99 |
| do. | Styrene oxide | 90 | 99 |

Analysis showed 58 percent of ruthenium carbonyl complex to be present when benzyl formate was used as the additive.

EXAMPLE 18

The catalyst, RuCl$_2$(Ph$_3$P)$_3$, (0.05 g), was dissolved in 10 ml of 4-vinylcyclohexene to which various amounts of octanoic acid were added. After warming the mixture at 90°C and 120°C, respectively, for 24 hours the extent of isomerization to 3- and 4-ethylidenecyclohexene was determined by glpc analysis. The results are tabulated below.

| Catalyst (50 mg.) | Acid | Temp. (°C.) | % Reaction 4-VCH (10 ml) 6 hours | 24 hours |
|---|---|---|---|---|
| RuCl$_2$(Ph$_3$P)$_3$ | None | 90 | 1 | 5 |
| do. | 5 µl | 90 | 1 | 4 |
| do. | 10 µl | 90 | 1 | 6 |
| do. | 50 µl | 90 | 1 | 3 |
| do. | 10 mls | 90 | 0 | 0 |
| do. | 10 mls | 120 | 0 | 1 |

Analysis failed to reveal the presence of any organometallic ruthenium carbonyl complex.

EXAMPLE 19

The catalyst, RuCl$_2$(Ph$_3$P)$_3$, (0.05 g), was dissolved in 10 ml of 4-vinylcyclohexene to which various amounts of ethyl octanoate were added. After warming the mixture at 90°C for 24 hours the extent of isomerization to 3- and 4-ethylidenecyclohexene was determined by g.l.p.c. analysis. The results are tabulated below.

| Catalyst (50 mg.) | Ester | Temp. (°C.) | % Reaction 4-VHC (10 ml) 6 hours | 24 hours |
|---|---|---|---|---|
| RuCl$_2$(Ph$_3$P)$_3$ | None | 90 | 1 | 5 |
| do. | 10 µl | 90 | 1 | 6 |
| do. | 50 µl | 90 | 0.5 | 1.5 |
| do. | 10 ml | 90 | 2 | 4 |

Analysis failed to reveal the presence of any organometallic ruthenium carbonyl complex.

What is claimed is:

1. A process for the isomerization of olefins which comprises contacting said olefins under an inert atmosphere with a catalyst consisting essentially of a metal carbonyl of the formula

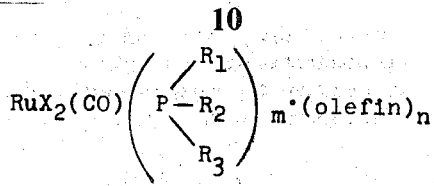

wherein X is halogen; R$_1$, R$_2$ and R$_3$ are lower alkyl groups having from 1 to 6 carbon atoms, cycloalkyl or aryl, and each of R$_1$, R$_2$ and R$_3$ may be the same or different; $m$ is 2 or 3; and $n$ is 0 or 1.

2. The process according to claim 1 wherein the metal carbonyl catalyst is formed in situ by reacting in the presence of the olefin starting material a metal complex of the formula

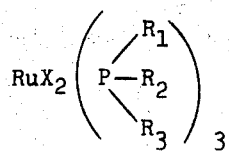

wherein X is halogen and R$_1$, R$_2$ and R$_3$ are lower alkyl groups having from 1 to 6 carbon atoms, cycloalkyl or aryl wherein R$_1$, R$_2$ and R$_3$ may be the same or different, with an organic compound which is decarbonylated by said metal complex, said organic compound being present in amounts of from about $10^{-1}$ to $10^{-3}$ moles per liter of olefin starting material.

3. The process according to claim 2 wherein the compound which is decarbonylated is carbon monoxide, a formate ester, an epoxide, an aldehyde or an alcohol.

4. The process according to claim 2 wherein the compound which is decarbonylated is CO, ethylene oxide, styrene oxide, benzaldehyde, phenylacetaldehyde, crotonaldehyde or benzylformate.

5. The process according to claim 2 wherein the metal complex catalyst is RuCl$_2$(Ph$_3$P)$_3$, wherein Ph is phenyl.

6. The process according to claim 1 wherein the amount of metal complex catalyst present is in the range of from about $10^{-2}$ to $10^{-4}$ moles per liter of olefin starting material.

7. In the process for the isomerization of olefins in the presence of a catalyst consisting essentially of a metal complex of the formula

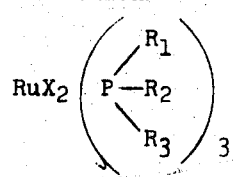

wherein X is halogen; and R$_1$, R$_2$ and R$_3$ are lower alkyl groups having from 1 to 6 carbon atoms, cycloalkyl or aryl, wherein R$_1$, R$_2$ and R$_3$ may be the same or different; the improvement which comprises carrying out said process under an inert atmosphere in the presence of an organic compound which reacts with said catalyst to form carbonyl derivatives thereof, said carbonyl compound being present in amounts of from $10^{-1}$ to $10^{-3}$ moles per liter of olefin starting material.

8. The process according to claim 7 wherein the compound which is decarbonylated is carbon monoxide, a formate ester, an alkyl oxide, an aldehyde, an alcohol or an epoxide.

9. The process according to claim 7 wherein the metal complex catalyst is RuCl$_2$(Ph$_3$P)$_3$, wherein Ph is phenyl.

10. A process for the isomerization of olefins which comprises contacting said olefins under an inert atmosphere with a catalyst consisting essentially of a metal carbonyl of the formula

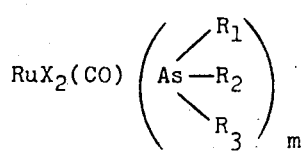

wherein X is halogen; $R_1$, $R_2$ and $R_3$ are lower alkyl groups having from 1 to 6 carbon atoms, cycloalkyl or aryl, wherein $R_1$, $R_2$ and $R_3$ may be the same or different; and $m$ is an integer of from 2 to 4.

11. The process according to claim 10 wherein the metal carbonyl catalyst is formed in situ by reacting in the presence of the olefin starting material a metal complex of the formula

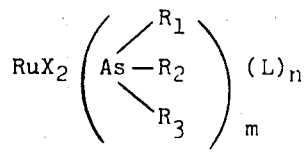

wherein X is halogen; $R_1$, $R_2$ and $R_3$ are lower alkyl groups having from 1 to 6 carbon atoms, cycloalkyl or aryl, wherein $R_1$, $R_2$ and $R_3$ may be the same or different; L is a lower molecular weight alcohol or ketone; $m$ is an integer of from 2 to 4; and $n$ is 0 or 1, with an organic compound which is decarbonylated by said metal complex.

* * * * *